(12) United States Patent
Ninan et al.

(10) Patent No.: US 10,371,884 B2
(45) Date of Patent: Aug. 6, 2019

(54) TILED ASSEMBLIES FOR A HIGH DYNAMIC RANGE DISPLAY PANEL

(71) Applicant: Dolby Laboratories Licensing Corporation, San Francisco, CA (US)

(72) Inventors: Ajit Ninan, San Jose, CA (US); Robin Atkins, San Jose, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 15/501,400

(22) PCT Filed: Aug. 3, 2015

(86) PCT No.: PCT/US2015/043428
§ 371 (c)(1),
(2) Date: Feb. 2, 2017

(87) PCT Pub. No.: WO2016/022476
PCT Pub. Date: Feb. 11, 2016

(65) Prior Publication Data
US 2017/0235041 A1    Aug. 17, 2017

Related U.S. Application Data

(60) Provisional application No. 62/032,832, filed on Aug. 4, 2014.

(51) Int. Cl.
*G02F 1/13357*    (2006.01)
*F21V 8/00*    (2006.01)

(52) U.S. Cl.
CPC ......... *G02B 6/0078* (2013.01); *G02B 6/0031* (2013.01); *G02B 6/0046* (2013.01);
(Continued)

(58) Field of Classification Search
None
See application file for complete search history.

(56) References Cited

U.S. PATENT DOCUMENTS 6,768,525 B2    7/2004    Paolini
7,311,431 B2    12/2007   Chew
(Continued)

FOREIGN PATENT DOCUMENTS

CN    1512231 A    7/2004
EP    0509096      10/1992
(Continued)

OTHER PUBLICATIONS

Chinese Office Action for Application No. 201580039935.3, filed on Aug. 3, 2015, on behalf of Dolby Laboratories Licensing Corporation. dated Dec. 11, 2018. 22 pages. English & Chinese.

*Primary Examiner* — Andrew J Coughlin

(57) ABSTRACT

Techniques are provided for a high dynamic range panel that includes an array of light sources (202,203) illuminating a corresponding array of light guides (204, 206). A light source (202) of the array illuminates a first light guide (204). The light source directly underlies, such as in a cavity (208), a second light guide (206) that is adjacent to the first light guide. The light source (202) does not extend below a bottom side (214) of either the first light guide or the second light guide to reduce thickness of the panel. The light source (202) and the first light guide (204) can be integrated as a tile assembly. Alternatively, the light source (202) and the second light guide (206) can be an integrated tile assembly. In a specific embodiment, the light source emits a blue or ultraviolet light, which is converted by quantum dots to a different color.

15 Claims, 7 Drawing Sheets

(52) U.S. Cl.
CPC ......... *G02B 6/0068* (2013.01); *G02B 6/0091* (2013.01); *G02B 6/0095* (2013.01); *G02B 6/0048* (2013.01)

(56) References Cited

U.S. PATENT DOCUMENTS

| | | | |
|---|---|---|---|
| 8,277,056 B2 | 10/2012 | Whitehead | |
| 8,446,351 B2 | 5/2013 | Whitehead | |
| 2006/0051048 A1* | 3/2006 | Gardiner | G02B 6/0036 385/146 |
| 2006/0221638 A1 | 10/2006 | Chew | |
| 2007/0086712 A1 | 4/2007 | Shani | |
| 2007/0247871 A1* | 10/2007 | Yoo | G02B 6/0021 362/612 |
| 2008/0084706 A1* | 4/2008 | Roshan | B82Y 20/00 362/601 |
| 2008/0101068 A1 | 5/2008 | Kitamura et al. | |
| 2008/0205078 A1 | 8/2008 | Karlicek | |
| 2008/0205080 A1 | 8/2008 | Erchak | |
| 2009/0303410 A1* | 12/2009 | Murata | G02B 6/002 349/58 |
| 2010/0149788 A1* | 6/2010 | Kim | G02B 6/0046 362/97.2 |
| 2010/0302805 A1* | 12/2010 | Jeong | G02B 6/0061 362/612 |
| 2011/0090423 A1 | 4/2011 | Wheatley | |
| 2014/0071032 A1 | 3/2014 | Kimura | |

FOREIGN PATENT DOCUMENTS

| | | |
|---|---|---|
| EP | 2336630 | 6/2011 |
| EP | 2378325 | 10/2011 |
| JP | 2010-021131 | 1/2010 |
| JP | 2013-506961 | 2/2013 |
| JP | 2013-068728 | 4/2013 |
| WO | 2006/064500 | 6/2006 |
| WO | 2010/137263 | 12/2010 |
| WO | 2011/025106 A1 | 3/2011 |
| WO | 2011/030941 A1 | 3/2011 |

* cited by examiner

TILED ASSEMBLIES FOR A HIGH DYNAMIC RANGE DISPLAY PANEL

CROSS-REFERENCE TO RELATED APPLICATIONS

This application claims the benefit of priority to U.S. Provisional Patent Application No. 62/032,832 filed 4 Aug. 2014, which is hereby incorporated by reference in its entirety.

TECHNOLOGY

The present invention relates generally to display techniques for high dynamic range images, and in particular, to compact displays for local dimming.

BACKGROUND

Dynamic range is the ratio of intensity of the highest luminance parts of an image scene and the lowest luminance parts of a scene. For example, the image projected by a video projection system may have a maximum dynamic range of 300:1.

The human visual system is capable of recognizing features in scenes which have very high dynamic ranges. For example, a person can look into the shadows of an unlit garage on a brightly sunlit day and see details of objects in the shadows even though the luminance in adjacent sunlit areas may be thousands of times greater than the luminance in the shadow parts of the scene. To create a realistic rendering of such a scene can require a display having a dynamic range in excess of 1000:1. The term "high dynamic range" (HDR) means dynamic ranges of at least 800:1.

Conventional display technology, using direct-lit local dimming (as an example, described by U.S. Pat. No. 8,277,056, "Locally Dimmed Display," incorporated herein for all purposes), is capable of rendering images in a manner that faithfully reproduces high dynamic ranges. This is accomplished by independent modulation of light sources, as well as modulation by one or more liquid crystal panels, for improved contrast. However, a direct-lit panel 100 cannot do so in a form factor sufficiently thin for many applications (e.g., a cellular telephone display). As shown in FIG. 1A, the width 102 of a direct-lit panel stacks the light sources, liquid crystal panel, and intervening optics (such as, a diffusion layer).

As an alternative to direct-lit panels, edge-lit technology (as an example, described in U.S. Pat. No. 8,446,351, "Edge Lit LED based Locally Dimmed Display," incorporated herein for all purposes) is employed with mixed results. As shown in FIG. 1B, an edge-lit panel 150 is thinner by not stacking a light source, and width 152 driven by the liquid crystal panel, light guide, and any intervening optics (not shown). That said, edge-lit panel 150 suffers from noticeably reduced HDR performance because light source modulation is row dependent and light intensity decreases along the length of the light guide (e.g., non-uniformity as a function of distance from the light source).

Accordingly, a need exists for a compact (e.g., thin) local dimming display capable of reproducing a wide range of light intensities.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY OF THE DESCRIPTION

Techniques are provided for a high dynamic range panel that includes an array of light sources illuminating a corresponding array of light guides. A light source of the array illuminates a first light guide. The light source directly underlies, such as in a cavity, a second light guide that is adjacent to the first light guide. The light source does not extend below a bottom side of either the first light guide or the second light guide to reduce thickness of the panel.

In an embodiment of the invention, an apparatus includes a first light source to illuminate a first light guide with blue or ultraviolet light. The first light source is within a cavity formed by at least the first light guide and a second light guide. A second light source illuminates the second light guide with the blue or ultraviolet light. The second light guide is adjacent to the first light guide. The first light guide includes a sloped surface generating a broad spectrum light (e.g., white light) from the blue or ultraviolet light. The first light source does not extend beyond the cavity.

As another embodiment of the present invention, an apparatus includes an array of light sources respectively illuminating an array of light guides. A first light source of the array of light sources directly underlies a first light guide illuminated by a second light source in the array. The first light source does not extend below a bottom side of the first light guide. The first light guide includes a multi-faceted reflective layer that directs light to a different direction.

As yet another embodiment of the present invention, an apparatus includes a first light source to illuminate in a first direction a first light guide with a first light. The first light guide directs the first light to a second direction different from the first direction. A second light source illuminates in the first direction a second light guide with a second light. The second light guide directs the second light to the second direction. The second light guide is adjacent to the first light guide. The first light source underlies in the second direction the second light guide. The first and second light guides each include a multi-faceted reflective layer to direct light to the second direction. The first light source does not extend below a bottom side of the second light guide.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE POSSIBLE EMBODIMENTS

Example possible embodiments, which relate to HDR displays used for televisions, computer displays, tablets, PDAs, mobile cellular telephones, advertising displays or the like, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Figure 1A:
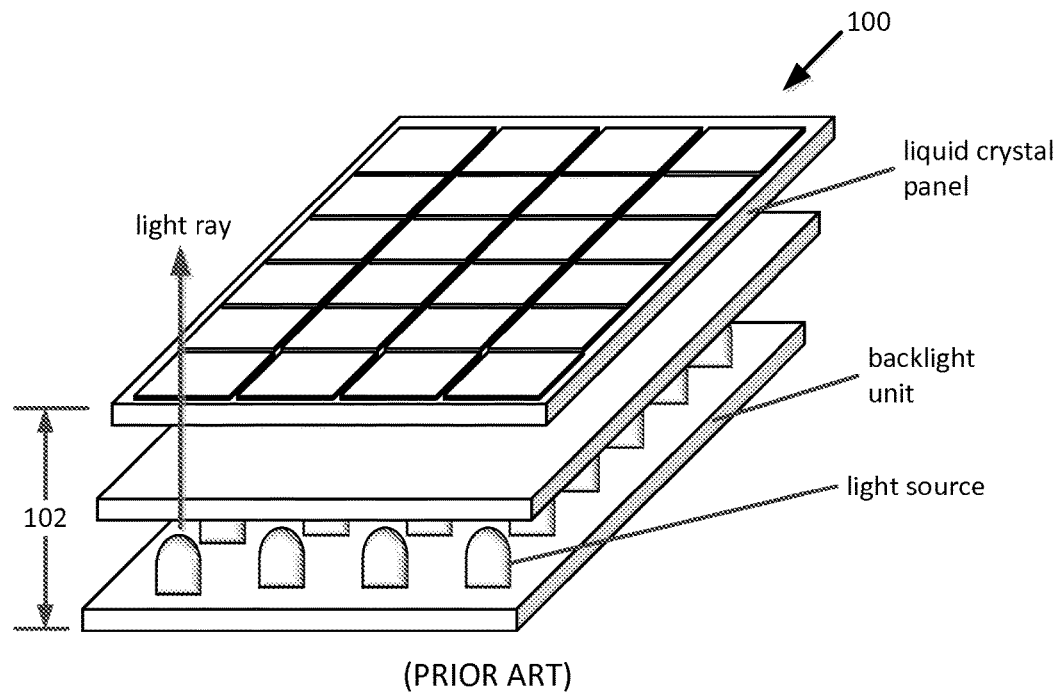
FIGS. 1A and 1B illustrate conventional direct lit and edge-lit displays, respectively.
Figure 1B:
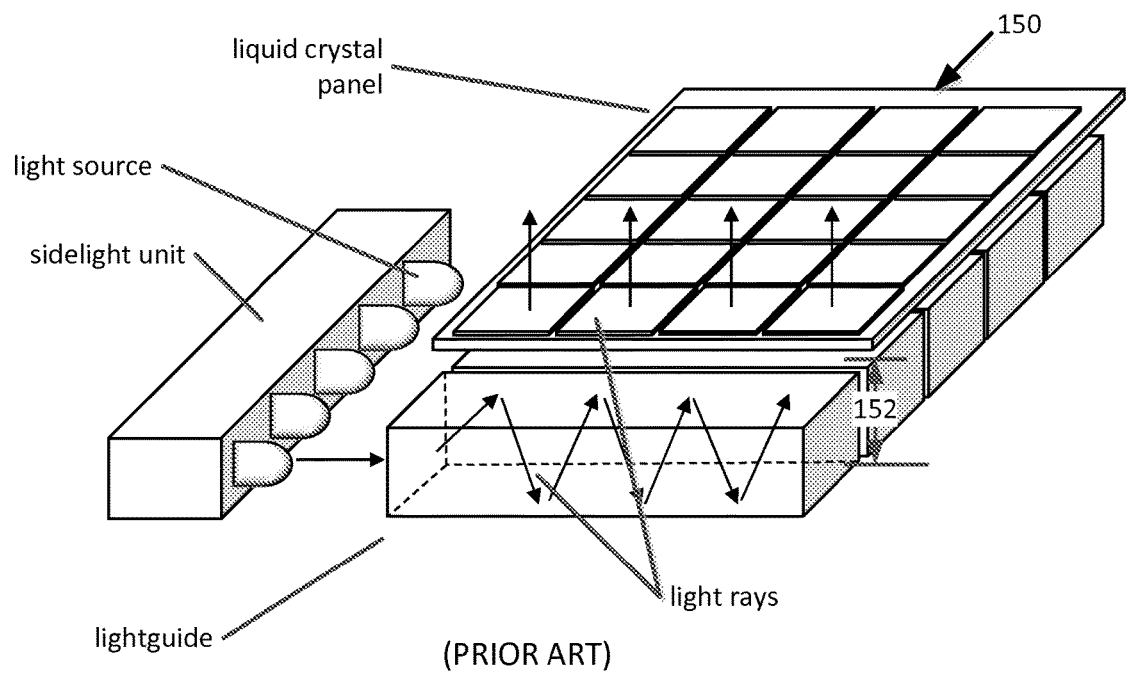
Figure 2:
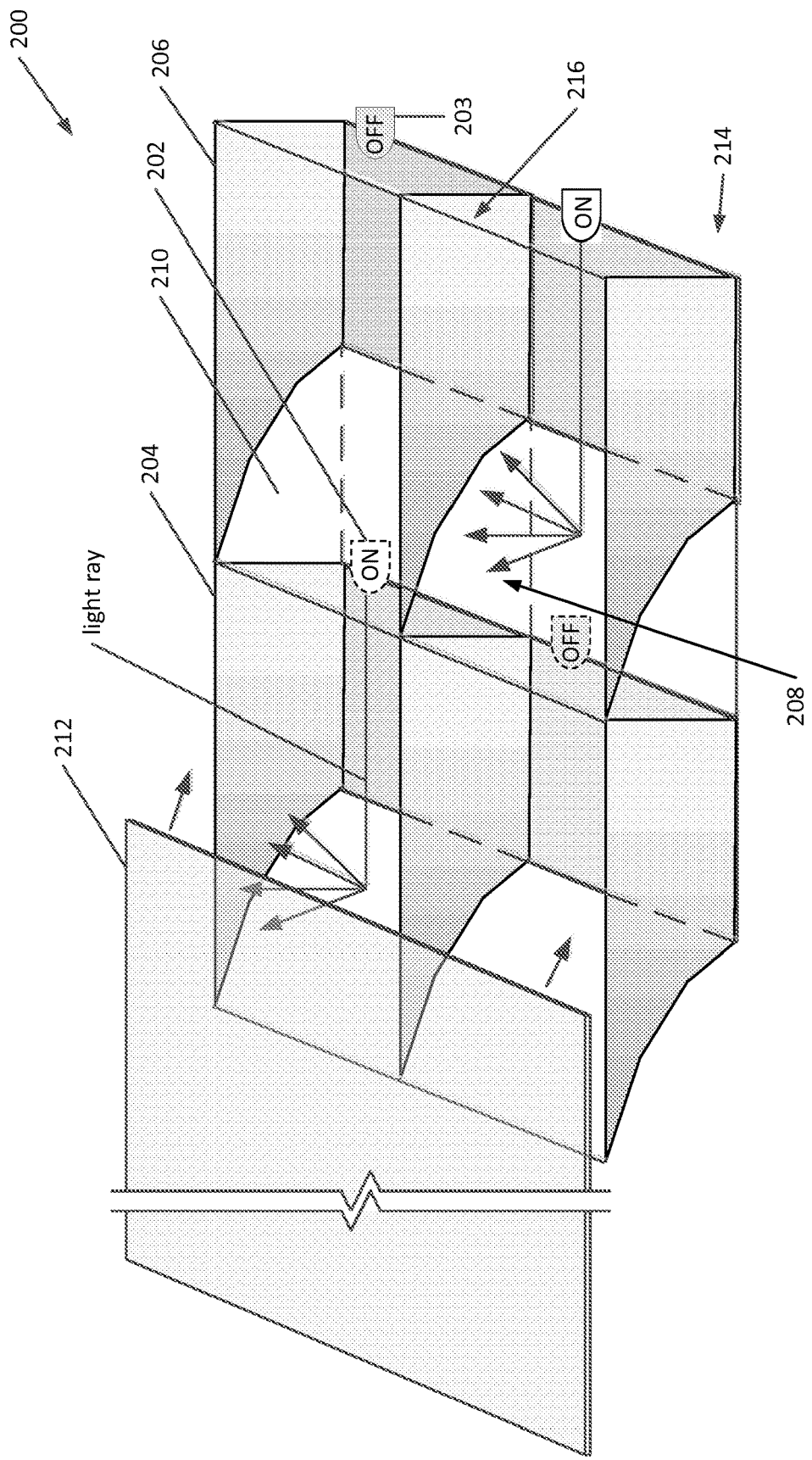
FIG. 2 illustrates an exemplary HDR array panel, according to an embodiment of the present invention.

FIG. 2 illustrates an exemplary HDR panel 200 according to an embodiment of the present invention. HDR panel 200 is a two dimensional array of pixel elements (e.g., 960×640; 113×640; 1920×1080; 4096×2160; 3840×2160), each pixel element includes at least a light source optically coupled to a light guide (i.e., an optical waveguide, such as optical fiber) in this example. Each light source is independently controllable for fine local dimming, or a subset of these light sources can be controlled in concert for coarse local dimming. Further, the spatial resolution of HDR panel 200 need not be the same, 1:1, as other optical elements, such as a liquid crystal panel (not shown). For example, the spatial resolution of HDR panel 200 can be 1:2, 1:4, 1:8 or less of the liquid crystal panel. In other words, a single light source of the backlight can be used to reproduce multiple pixels in an area of a display.

For improved compactness of panel 200, light sources are disposed within cavities underlying adjacent light guides. For example, light source 202 illuminates light guide 204, but it is placed in a cavity 208 of adjacent light guide 206. Light guide 206 is meanwhile illuminated by light source 203. Cavity 208 is an arbitrarily shaped void, hollow, opening, or the like sufficiently large to hold, completely or partially, light source 202. In a specific embodiment, a cavity is form fitting to partially encapsulate a light source (e.g., cavity closely follows, at least in part, the contours of the light source). For simplicity, surface 210 of light guide 206 defines size and shape of cavity 208. Further details relating to surface 210 are described more fully below in connection with FIGS. 3A-3E.

In one embodiment, light source 202 is physically mounted to light guide 204. This can be accomplished by a form factor housing both light source 202 and light guide 204. Alternatively light source 202 can be housed with adjacent light guide 203. These structures containing one light guide and a one or more light sources (e.g., one white LED, three LED sources for red green blue, or the like), referred hereinafter as a "tile assembly," provide benefits beyond compactness, such as a modular design.

Light guides (e.g., 204, 206) can be glass, polymer, semiconductor, plastic, or the like whether as slab, planar, rib, strip, segmented, or fiber structure. Light guides 204, 206 direct electromagnetic waves in the optical spectrum (e.g., light with a wavelength between about 380 to 800 nanometers) or a subset of the optical spectrum. Light guide 204 guides at least the desired wavelength(s) associated with light source 202.

Since light source 202 provides lateral illumination of light guide 204, light guide 204 is configured to reflect light in an outwards direction through a display's optical stack and ultimately to a viewer. In an implementation of the present invention, a surface of a light guide, such as surface 210 of light guide 206, is reflective. A reflective layer can be deposited (including by chemical vapor deposition), applied or affixed to, or under, to light guide 206 at surface 210. The reflective layer provides a specular reflection surface or diffuse reflection surface, depending on desirability. Example materials for the reflective layer include one or more of: metals (e.g., aluminum, gold, silver, copper, brass, mercury, nickel or the like), polished metals, paint (e.g., white paint, glossy paint, matte paint), optically reflective silicone, water, and plastic. The reflected light from light guide 206 can be further processed by subsequent elements in the optical stack. In FIG. 2, an optional layer 212, overlaid on one or more light guides, can diffuse the light for improved uniformity or alter the point spread function for less or more contribution to adjacent pixels.

Light source 202 can be a light-emitting diode (LED), organic light-emitting diode (OLED), active matrix organic LED, light-emitting electrochemical cell, field-induced electroluminescent polymer, cold cathode lamp, cold cathode fluorescent lamp, laser, phosphor coated LED, quantum dot coated LED, incandescent bulb, or any suitable source of electromagnetic waves of an appropriate wavelength, preferably thinner than the light guides. A combination of light sources of differing technologies can be employed in panel 200. In other words, light sources 202 and 203 can both be LEDs, but they need not be the same (e.g., as a specific embodiment, light source 202 can be an OLED, and light source 203 can be quantum dot coated LED).

In an embodiment of the present invention, light sources 202, 203 produce a broad spectrum light (e.g., white light) to illuminate light guides 204, 206. Color can be imparted to the light exiting light guides 204, 206 by several techniques. For example, subsequent color filters in the optical path can be used to produce each of the primary colors, such as red, green and blue. Specifically, a liquid crystal panel (not shown in FIG. 2) with subpixel color filters can be used.

A matrix array of quantum dot subpixel areas in the optical stack above a light guide can also convert light respectively to individual primary colors, e.g., red, blue, green and/or yellow. When light sources 202, 203 produce blue and/or ultraviolet light, surface 210 can optionally be a layer of quantum dots (i.e., semiconductor nanocrystals, when under excitation, emit light dependent on its size and shape) to generate broad spectrum light later imparted with color by filtering. Alternatively, the layer of quantum dots can be within, above, or below surface 210. As another embodiment, the light guides can reflect blue or ultraviolet light to the subsequent optical stack, which can include a quantum dot layer of a matrix of red light generating, green light generating, and blue light generating areas of quantum dots. If the appropriate blue light is directly generated by light sources 202, 203, then the blue light generating area can be replaced with either a transparent filter or no filter at all (e.g., a cut-out to pass light, without alteration).

As described above, light sources (e.g., light source 202) is positioned, partially or wholly, within a cavity 208 formed by an adjacent light guide (e.g., light guide 206). Light source 202 is at least partially within cavity 208, preferably primarily within cavity 208, and most preferably completely within cavity 208. For a thinner tile assembly, a light source should not extend below the lowest (bottom) side 214, relative to an optical stack of a display device, of either its corresponding light guide or its adjacent light guide. Similarly, the light source should not extend above the highest (top) side 216 of either its corresponding light guide or its adjacent light guide To the extent the light source extends above or below the light guides, thickness of the tile assembly is enlarged.

Figure 3A:
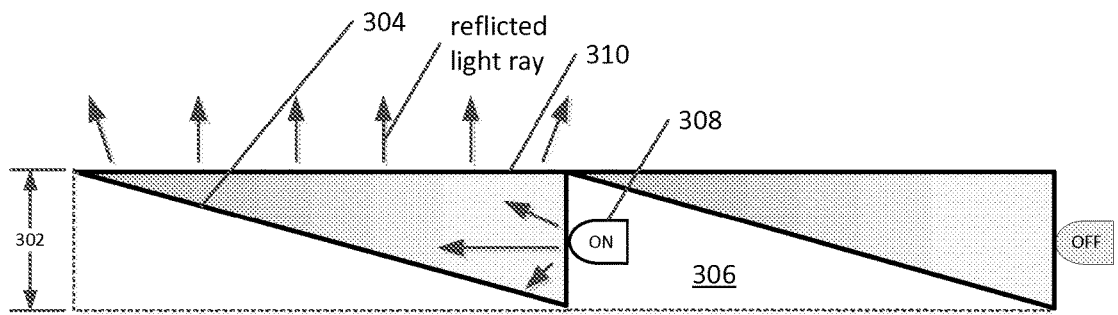
FIGS. 3A-3E illustrate simplified cross-sectional views of exemplary HDR color array panels, according to embodiments of the present invention.

FIGS. 3A, 3B, 3C, 3D, and 3E illustrate simplified cross-sectional views of exemplary HDR panels, according to embodiments of the present invention. FIG. 3A shows a linear surface 304. The slant angle of linear surface 304 can range from about 1° to about 89°, preferably about 10° to about 70°, and more preferably about 30° to about 60°. In another embodiment, surface 304 can vary non-linearly. The desired point spread function (PSF, a measure of the degree of spreading of a point object) of the reflected light, as well as sizing of cavity 306, will influence acceptable slant angles. In a preferred embodiment, cavity 306 is sufficiently ample to house light source 308, whether light source 308 is integrated as a tile assembly with light guide 310 or as a standalone light source device. Such an arrangement reduces thickness 302, compared to stacking an entire thickness of a light guide plus height of a light source.

Figure 3B:
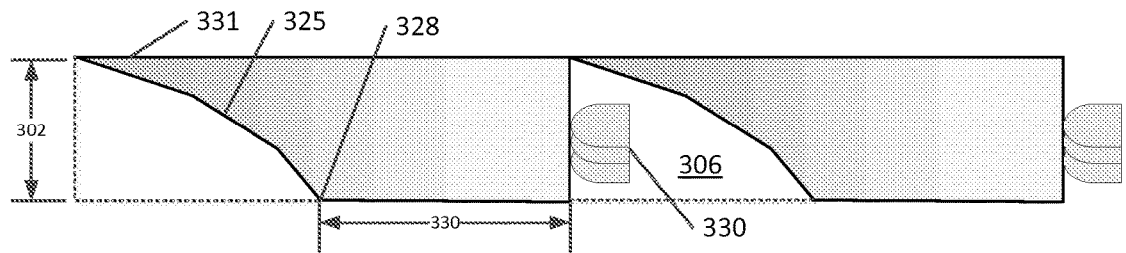
Figure 3C:
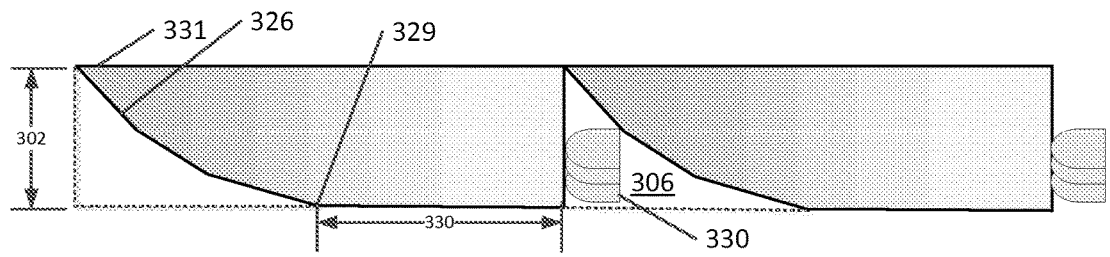
Figure 3D:
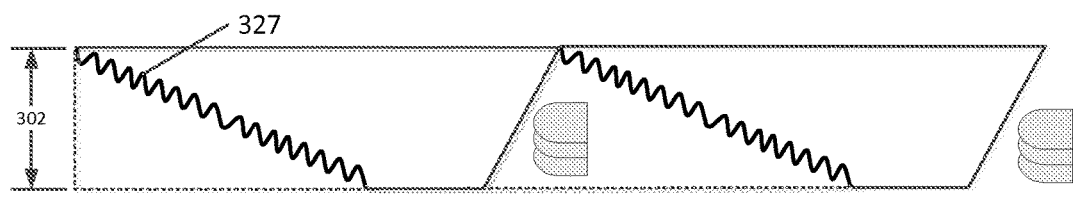

Referring to FIGS. 3B and 3C, light guides include multi-faceted, convex or concave, reflection surfaces 325 and 326, although reflection surfaces can be smoothed to avoid sharp angles. The angle and number of facets (e.g., two, three, four, five, six, seven or more facets) influence the PSF of the reflected light. In some instances, PSF that spread beyond one pixel area it is preferable. This increased PSF size reduces blocking artifacts associated with abrupt illumination changes at pixel boundaries. FIG. 3D shows an undulating surface 327, which can be any waveform, such as sinusoidal, square, triangle, sawtooth or the like, or combinations of the foregoing. The waveform can be either uniform or non-uniform in frequency or amplitude. For example, about a proximal start of surface 327 can have a higher frequency than about the distal end of surface 327. It should be appreciated, based on the teachings herein, that surfaces 325, 326, and 327 can vary with height, depth, and/or length (in all three dimensions). In other words, one side of a reflective surface (e.g., left side) can differ from its opposite side (e.g., right side) or its center. In an embodiment of the present invention, a reflecting surface in three dimensions can vary with azimuth, elevation, or both.

As depicted in the figures, the proximal start 328, 329 of reflection surfaces 325 and 326 is disposed away by a length 330 from illuminating light sources. Length 330 can substantially range from about 0% to about 99% of the length of the entire light guide, but preferably 35% to 85%. Likewise, the distal end of reflection surfaces 325 and 326 need not abut the end of the light guide, nor coincide with a top surface (e.g., 331) of the light guide—in other words, surfaces 325, 326 can be less than thickness 302. These considerations can also apply to reflective surface 304 of FIG. 3A.

In FIGS. 3B and 3C, instead of a single light source (e.g., white, blue or UV LED) for each light guide, primary light sources are arranged as a group 330. Group 330 is collectively housed, partially or wholly, in cavity 306. In other words, the primary light sources share a single light guide per group. It should be understood that in each of the embodiments described by this specification, a single light source and a group of primary light sources are interchangeable, depending on the desired architecture of a display device.

Figure 3E:
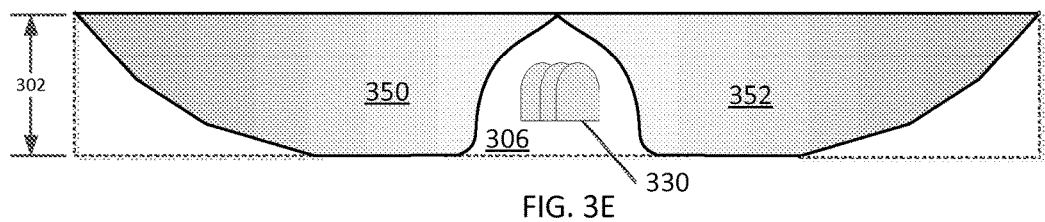

FIG. 3E illustrates a simplified cross-sectional view of exemplary HDR panels, according to another embodiment of the present invention. In this example, a group 330 of primary light sources illuminates two opposite facing light guides 350 and 352. Fewer light sources are needed, thus saving on bill of materials (BoM) cost, but reducing resolution for local dimming control. This implementation can earn further BoM savings by using group 330 to illuminate four or more light guides organized radially about group 330. In this scenario, an "expanded tile assembly," as a single module, can include group 330 and its plurality of illuminated light guides.

Figure 4A:
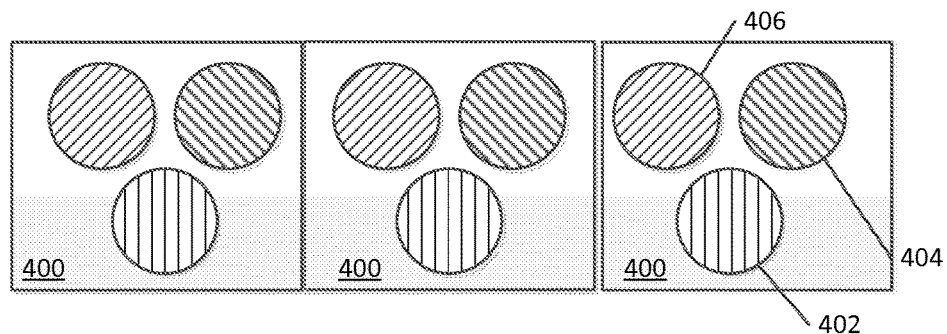
FIGS. 4A-4C illustrates exemplary groups of primary light sources, according to an embodiment of the present invention.
Figure 4B:
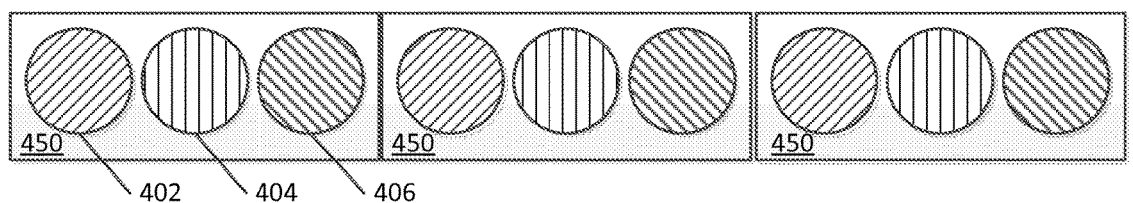
Figure 4C:
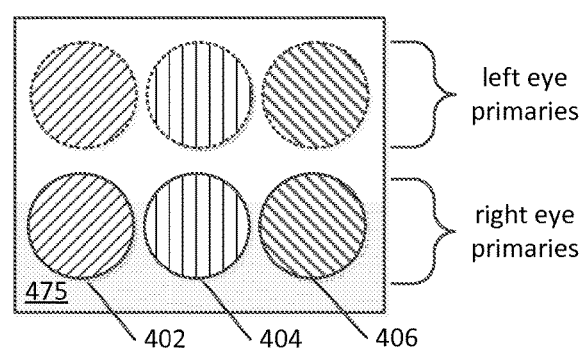

FIGS. 4A, 4B and 4C illustrates exemplary groups 400, 450, 475 of primary light sources, according to an embodiment of the present invention. Groups 400, 450 and 475 can be applied to the embodiments described above in connection with FIGS. 2 and 3A-3D. Groups 400 and 450 are illustrated to show three primary light sources 402, 404, and 406; however, there can be two, four, 5 or more primaries in an HDR panel. For example, an HDR panel can implement any one of RGB, RGB+yellow, RGB+white, or RGB+yellow+cyan.

For a three dimensional (3D) rendering panel utilizing spectral separation, group 475 includes six primary light sources. A viewer wears spectrally sensitive glasses such that different components of the illuminated light are directed to the viewers' left and right eyes. As an example, a first red primary is perceived in a viewer's left eye, but a second red primary (spectrally different from the first) is filtered by the left eye lenses of the 3D glasses. For the right eye, the second red primary is perceptible, but not the first. Accordingly, group 475 includes two sets of primaries that do not overlap spectrally. Additional details about 3D spectral separation as used for cinema projection are described in U.S. Pat. No. 7,784,938, which is hereby incorporated herein by reference for all purposes.

Figure 5:
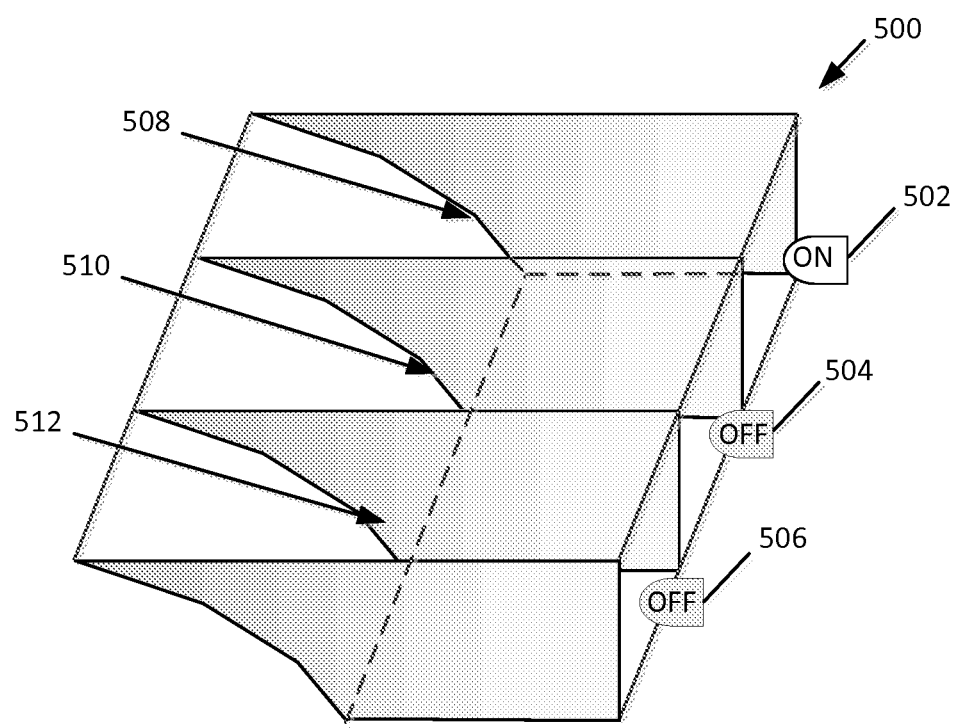
FIG. 5 illustrates a tile assembly for subpixel resolution, according to an embodiment of the present invention.
Figure 6A:
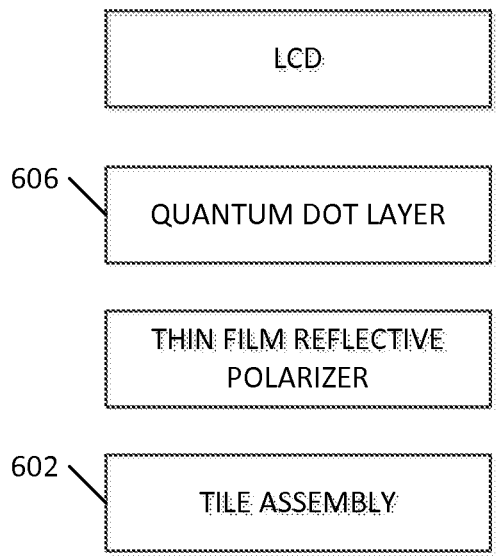
FIGS. 6A-6D illustrate and exemplary HDR display, according to an embodiment of the present invention.
Figure 6B:
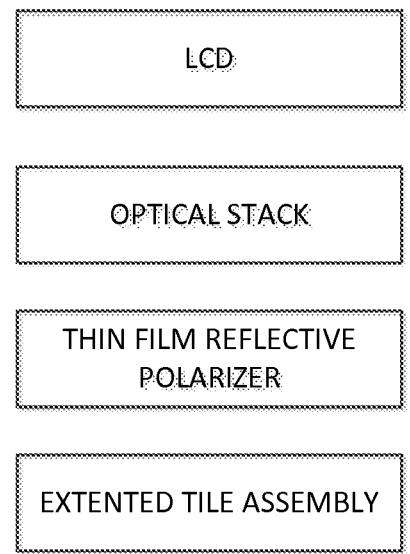
Figure 6C:
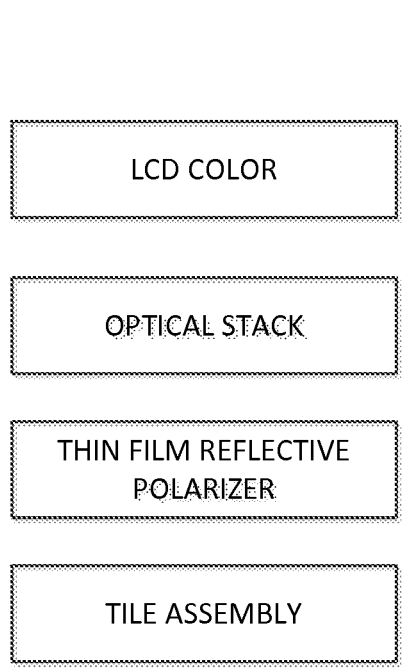
Figure 6D:
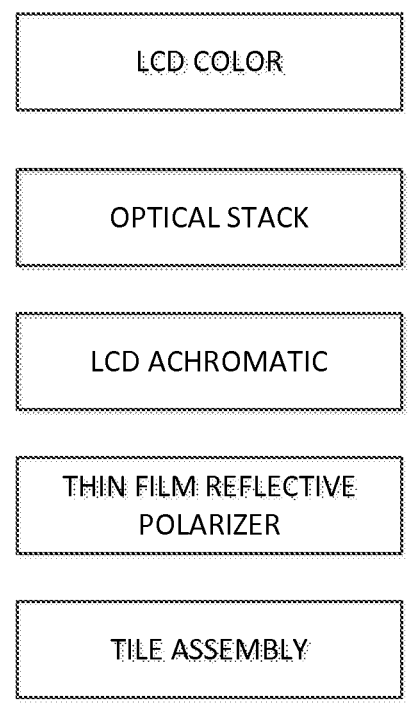

FIG. 5 illustrates a tile assembly 500 for subpixel resolution, according to an embodiment of the present invention. A plurality of light sources (e.g., 502, 504, and 506 or more) emanating a display's primary colors are coupled to respective light guides (e.g., 508, 510, and 512). For example, light source 502 can be a red LED, light source 504 can be a green LED, and light source 506 can be a blue LED. The light output from light guides 508, 510, and 512 provide subpixel color modulation by the backlight, as well as further modulation by a liquid crystal display (not shown). This tile assembly avoids the use of color filters in the optical stack and quantum dots. It should be appreciated that the resulting spatial resolution of the HDR panel comprising an array of tile assemblies 500 can be less than, equal to, or greater than other optical components, such as the liquid crystal panel.

FIGS. 6A-6D illustrate an exemplary HDR display, according to embodiments of the present invention. The structures depicted in FIGS. 6A-6D can be applied to one or more of the embodiments described above for FIGS. 2, 3A-3D, 4A-4C, and 5, as would be readily apparent by a person skilled in the art benefiting from the teachings of this specification. It will also be apparent that one or more of the depicted layers in FIGS. 6A-6D are optional. For example, if the tile assembly 602 includes quantum dots, then quantum dot layer 606 can be omitted.

Figure 7:
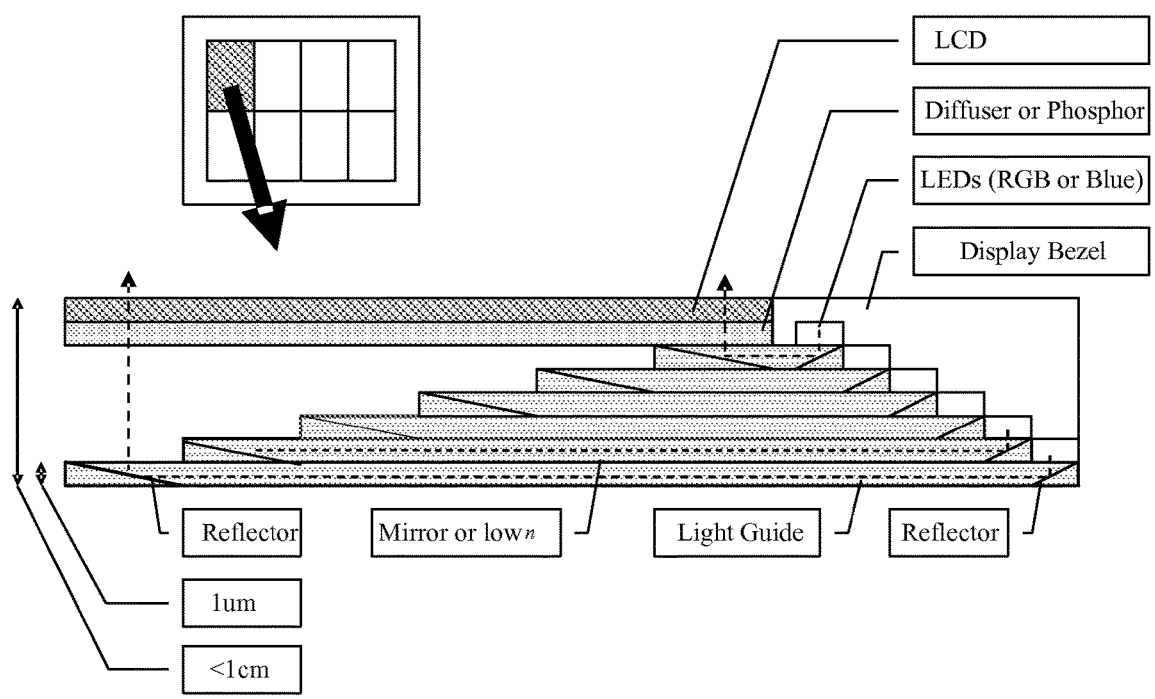
FIG. 7 illustrates an exemplary HDR display with a compact design, according to an embodiment of the present invention.

FIG. 7 illustrates an exemplary HDR display with a compact design, according to an embodiment of the present invention. Light sources (such as white LEDs, RGB LED groups, etc.) are mounted along the edges of an LCD display. The light sources are tiled as closely as possible in two dimensions along the edge of the display, essentially creating a low-resolution backlight.

The light is directed to the desired location behind the LCD display. First, the light sources emit light into a planar light guide. The light is transmitted along the light guide either by total internal reflection (TIR) or by reflective boundaries. Eventually, light is reflected upwards through a diffuser and LCD. As illustrated in FIG. 7, the light sources transmit light at 90 degrees to the light guide to allow for the light guides to be very thin (order of um). The light is reflected along the light guides using an angled reflector or TIR. Alternatively, the LEDs could emit light directly into the light guide.

The backlight optics can be tiled or continuous across the display, with light being emitted along both top and bottom, or left and right edges. Instead of reflecting the light upwards towards the LCD as described above for FIG. 7, a top surface of the light guide could be diffused if using TIR, or the reflector could be terminated to eject light from the light guide in the desired location.

Color Wavelengths

This specification often refers to colors, such as blue, ultraviolet, red, green, etc. Without limiting the generality of the teachings herein, light colors can be within about the following ranges for one or more embodiments of the invention:

(i) blue—450 to 490 nanometers (nm);
(ii) red—635 to 700 nm;
(iii) green—490 to 560 nm;
(iv) ultraviolet—10 nm to 400 nm (with near UV, 300 to 400 nm);
(v) white—a combination of visible light of different wavelengths perceived by the human visual system as having no specific color (e.g., average noon sunlight; CIE (International Commission on Illumination) standard illuminant D65), visible light generally ranging from 380 nm to 800 nm.

EQUIVALENTS, EXTENSIONS, ALTERNATIVES AND MISCELLANEOUS

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

ADDITIONAL REFERENCES

The following references, in addition to any reference cited above, are incorporated by reference herein for all purposes:

(i) International Publication No. WO 2006/064500, Device and method for optical resizing;
(ii) US Patent Publication No. 2007/0086712 Device and method for optical resizing and backlighting;
(iii) US Patent Publication No. 2008/0205078 Illumination tiles and related methods;
(iv) US Patent Publication No. 2008/0205080 Tiled illumination assembly and related methods;
(v) U.S. Pat. No. 7,311,431, Light-emitting apparatus having a plurality of adjacent, overlapping light-guide plates;
(vi) U.S. Pat. No. 6,768,525, Color isolated backlight for an LCD; and
(vii) European Patent Application Publication No. 509096 Image display device and method of producing the same.

What is claimed is:

1. An apparatus for a display, the apparatus comprising:
   a first light source to illuminate in a first direction a first light guide with a first light, the first light guide directing the first light to a second direction different from the first direction;
   a second light source to illuminate in the first direction a second light guide with a second light, the second light guide directing the second light to the second direction and the second light guide being adjacent to the first light guide; and
   a quantum dot layer,
   wherein the first light source directly underlies in the second direction the second light guide, and the first and second light guides each include a multi-faceted reflective layer to direct light to the second direction, wherein the multi-faceted reflective layer in three dimensions varies with azimuth, and
   wherein the first light source does not extend below a bottom side of the second light guide and the multi-faceted reflective layer has an undulating cross-section covering the second light source, the undulating cross-section being a waveform that has a higher frequency at an end proximal to the first light source than at an end distal to the first light source,
   wherein the first light guide does not overlap the second light guide in the second direction, and
   wherein the first direction is parallel to a flat portion of the first light guide and configured such that the first light source scatters light off the undulating cross-section of the multi-faceted reflective layer of the first light guide.

2. The apparatus of claim 1 wherein the first light source is disposed within a cavity formed by the first and second light guides.

3. The apparatus of claim 1 wherein the first and second light sources are at least one of blue and ultraviolet light emitting diodes.

4. The apparatus of claim 1 wherein the first and second light sources produce at least one of blue and ultraviolet light, and wherein the quantum dot layer of the apparatus produces a red light from the at least one of blue and ultraviolet light.

5. The apparatus of claim 1 wherein the first and second light sources produce at least one of blue and ultraviolet light, and wherein the quantum dot layer of the apparatus produces a green light from the at least one of blue and ultraviolet light.

6. The apparatus of claim 1 wherein the multi-faceted reflective layer includes at least 3 facets.

7. The apparatus of claim 1 wherein the first light source and the second light guide are physically coupled as a tile assembly.

8. The apparatus of claim 1 wherein the first light source and the first light guide are physically coupled as a tile assembly.

9. The apparatus of claim 1 wherein second direction is perpendicular from the first direction.

10. An apparatus for a display, the apparatus comprising:
an array of light sources respectively illuminating an array of light guides;
a first light source of the array of light sources directly underlies a first light guide illuminated by a second light source in the array, the first light source not extending below a bottom side of the first light guide;
wherein the first light guide includes a multi-faceted reflective layer that directs light to a different direction, wherein the multi-faceted reflective layer in three dimensions varies with azimuth, and
wherein the multi-faceted reflective surface includes at least 3 facets and has an undulating cross-section covering the second light source, the undulating cross-section being a waveform that has a higher frequency at an end proximal to the first light source than at an end distal to the first light source,
wherein the first light guide does not overlap the second light guide in the different direction, and
wherein the first light source is configured to illuminate in a direction that is parallel to a flat portion of the first light guide and configured such that the first light source scatters light off the concave and undulating cross-section of the multi-faceted reflective layer of the first light guide.

11. The apparatus of claim 10 wherein the first light source is disposed within a cavity formed by the first light guide and a second light guide.

12. The apparatus of claim 10 wherein the first and second light sources are at least one of blue and ultraviolet light emitting diodes.

13. The apparatus of claim 10 wherein the first and second light sources produce at least one of blue and ultraviolet light, and wherein a quantum dot layer of the apparatus produces a red light from the at least one of blue and ultraviolet light.

14. The apparatus of claim 10 wherein the first light source and the first light guide are physically coupled as a tile assembly.

15. The apparatus of claim 10 wherein the first light source and the second light guide are physically coupled as a tile assembly.

* * * * *